United States Patent [19]

Anderson et al.

[11] Patent Number: 4,779,476
[45] Date of Patent: Oct. 25, 1988

[54] THIN-WALLED SPLINED AND FLANGED POWER TRANSMISSION MEMBER

[75] Inventors: Carl E. Anderson, Mt. Clemens; James T. Killop, Warren, both of Mich.

[73] Assignee: Anderson-Cook, Inc., Fraser, Mich.

[21] Appl. No.: 19,363

[22] Filed: Feb. 26, 1987

Related U.S. Application Data

[60] Division of Ser. No. 747,971, Jun. 12, 1985, Pat. No. 4,677,836, which is a continuation-in-part of Ser. No. 626,286, Jun. 29, 1984, abandoned.

[51] Int. Cl.$^4$ .................. F16H 55/00; F16H 55/17
[52] U.S. Cl. ............................... 74/434; 192/70.2
[58] Field of Search .................... 74/431–434, 74/439, 449; 188/72.3, 72.4; 192/70.2, 70.19, 85 AA; 72/88; 474/152, 158, 159, 165

[56] References Cited

U.S. PATENT DOCUMENTS

| | | | |
|---|---|---|---|
| 994,141 | 6/1911 | Fletcher | 192/70.2 |
| 2,137,977 | 11/1938 | Kattwinkel | 192/70.2 |
| 3,237,731 | 3/1966 | DuBois | 192/70.2 |
| 3,359,819 | 12/1967 | Veillette et al. | 74/439 |
| 3,396,596 | 8/1968 | Fischer | 74/433 |
| 3,982,415 | 9/1976 | Killop | 74/431 |
| 4,014,619 | 3/1977 | Good et al. | 192/70.2 |
| 4,244,206 | 1/1981 | Krull | 474/152 |
| 4,440,282 | 4/1984 | Ishimaru et al. | 192/70.2 |
| 4,547,180 | 10/1985 | Hayashi | 474/159 |

FOREIGN PATENT DOCUMENTS

| | | | |
|---|---|---|---|
| 57-94166 | 6/1982 | Japan | 474/152 |
| 57-94167 | 6/1982 | Japan | 474/152 |

*Primary Examiner*—Lawrence Staab
*Attorney, Agent, or Firm*—Reising, Ethington, Barnard, Perry & Milton

[57] ABSTRACT

A power transmission member (42), as well as apparatus (10,110,210) and method for forming the power transmission member (42) from a thin-walled blank. The apparatus (10,110,210) comprises a pair of opposed toothed dies (26,30;112,114;138,140). A toothed mandrel (40) is rotatably supported between the dies and received within the sleeve portion (46), flatly engaging an annular end wall (44) of the member. The dies (26,30;112,114;138,140) and mandrel (40) have chamfered surfaces (68,70), respectively, for forming a chamfered flange (66) on the power transmission member (42) as the toothed surfaces of the dies are relatively moved during the splining operation. A loading notch (122) is formed intermediately along the toothed work surfaces of each die member (112,114;138,140) for receiving a blank to be splined when the notches (122) are vertically aligned with one another in a neutral or loading position on opposite sides of the mandrel. Groups or rough (124,126,128) and finish (130,132) forming teeth are spaced along opposite sides of the notches (122), and progressively increase in height from group-to-group away from the notches. Initial opposed movement of the dies (112,114;138,140) from the loading position simultaneously engages opposing pairs of similar rough forming teeth (124,126,128) and the mandrel teeth (48) with the sleeve portion (46) therebetween, rough forming splines therein. The dies (112,114;138,140) are then moved in the reverse direction, simultaneously engaging opposed pairs of similar finishing teeth (130,132) and the mandrel teeth (48) with the sleeve (46) therebetween to finish forming the splines (64) therein. Opposed rows of raised synchronizing teeth (142) respectively extend along the toothed work surfaces of the dies and mandrel and are spaced inwardly therefrom, meshing together to rotate the mandrel and coordinate the relative movement of the dies and mandrel during a splining operation.

2 Claims, 6 Drawing Sheets

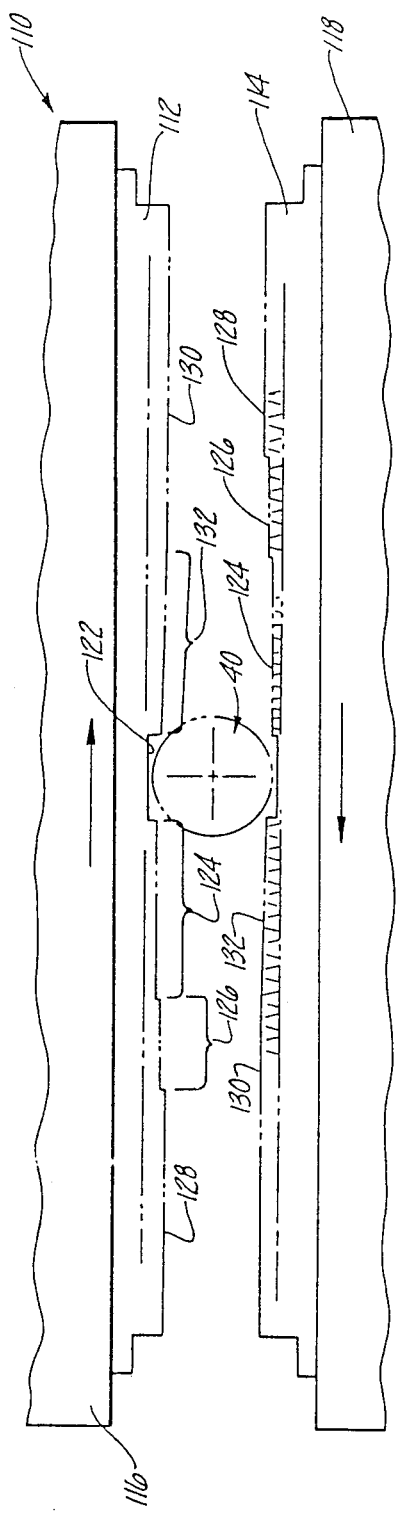
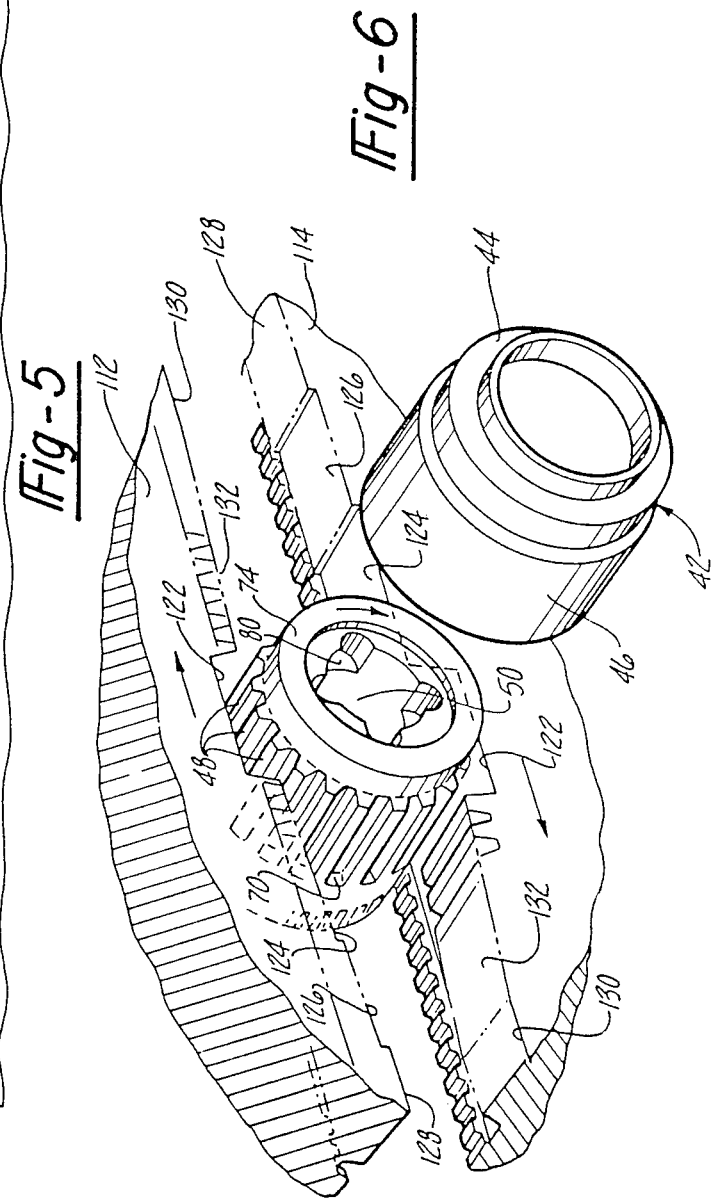

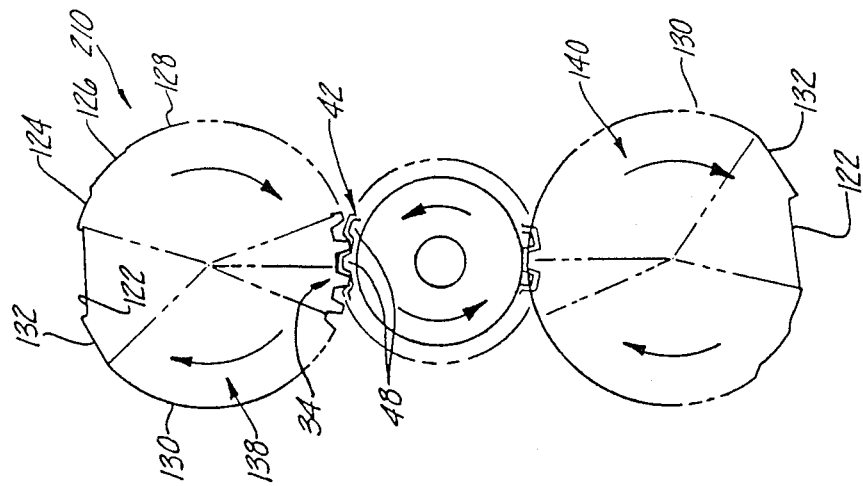
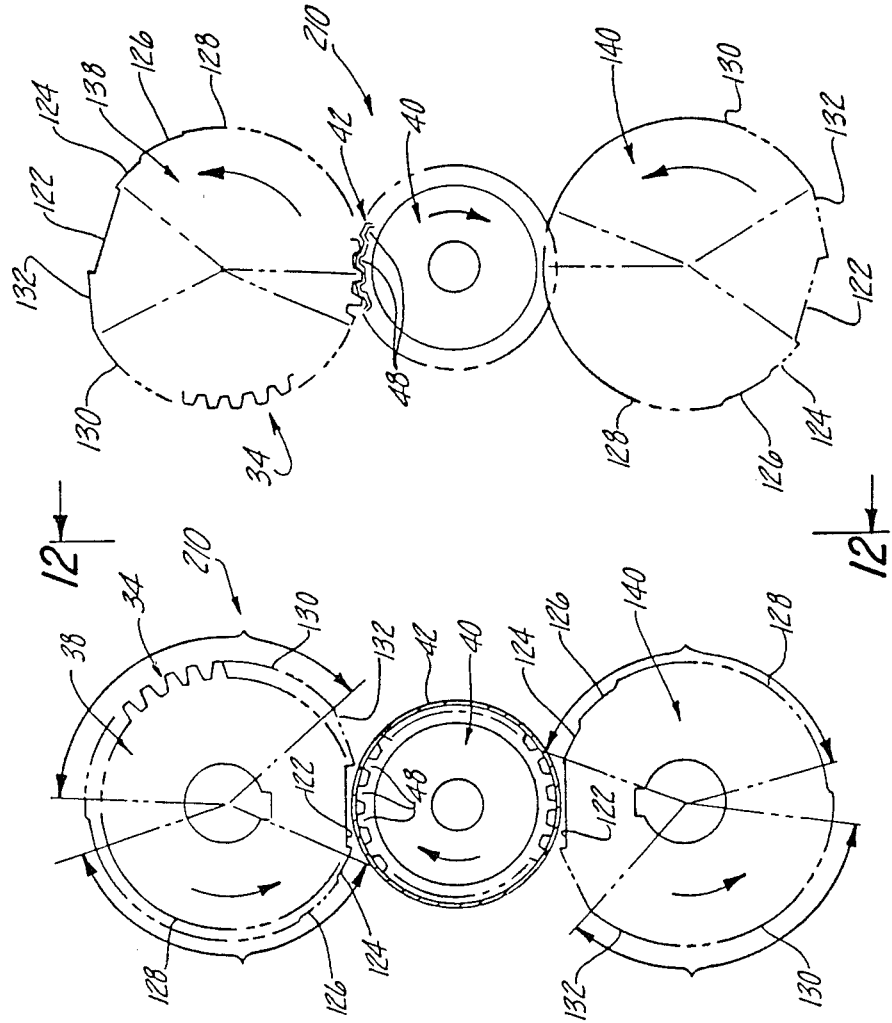

THIN-WALLED SPLINED AND FLANGED POWER TRANSMISSION MEMBER

RELATED APPLICATION

This application is a divisional of Ser. No. 747,971, filed June 12, 1985, now U.S. Pat. No. 4,677,836, which is a continuation-in-part of Ser. No. 626,286, filed June 29, 1984 now abandoned.

TECHNICAL FIELD

This application relates to splined, thin-walled power transmission members, and to a method and apparatus for making the power transmission member from a thin-walled blank.

BACKGROUND OF INVENTION

Power transmission members to which this invention relates are disclosed in U.S. Pat. No. 3,982,415, assigned to the same assignee as the subject invention, the entire disclosure of which is incorporated by reference herein.

The coupling and uncoupling of clutch components within a vehicle automatic transmission clutch is accomplished by the use of clutch discs and a power transmission member embodied as a clutch hub of the type to which the instant invention is directed.

Such a clutch hub has a generally cup-shaped configuration with an annular end wall used to mount the hub on a mandrel, as well as a thin-walled annular sleeve portion wherein the clutch hub splines are formed. The end wall extends radially in an inward direction from one end of the sleeve portion which extends axially.

U.S. Pat. No. 3,982,415, issued Sep. 28, 1976, discloses a method and machine for splining a power transmission member by rolling, as well as the resultant splined member. An externally toothed pinion-type mandrel of the machine is rotatably mounted between a pair of elongated die racks. An unsplined member is supported by the mandrel so that sliding movement of the elongated dies from an initial end-to-end relationship to an overlapping relationship meshes teeth on the dies and the teeth on the mandrel with a thin-walled annular sleeve portion of the member therebetween. The meshing of the die and mandrel teeth deforms the sleeve portion of the member radially in a rolling manner, forming splines as the mandrel rotates. A concern arising during such a splining operation is the deficiency of the blank to become oblong due to non-uniform radial deformation thereof; moreover, end-to-end movement of the dies requires a large-sized machine.

STATEMENT OF INVENTION AND ADVANTAGES

The present invention is directed to a power transmission member, as well as apparatus and method for forming. The apparatus comprises a plurality of dies having opposed toothed work surfaces and a mandrel having a toothed work surface situated therebetween for receiving a blank to be splined and to be rotated upon movement of the work surfaces in opposite directions during a spline forming operation. The invention is characterized by cooperating chamfering means on the dies and mandrel operable during a spline forming operation for forming an outwardly projecting chamfered flange on the blank.

Each of the dies has a notch intermediate the face thereof to permit loading of a clutch hub blank onto the mandrel when the notches are vertically aligned with one another in a neutral or loading position on opposite sides of the mandrel. Rough forming teeth, progressively increasing in height, extend away from the notch on one side thereof and finishing teeth having a height greater than the rough forming teeth extend respectively along the other side away from each of the notches.

A method for forming splines in a thin-walled annular sleeve portion of a blank having an annular end wall comprises the steps of: positioning the sleeve portion of the blank on a mandrel having a toothed work surface with the end wall of the blank engaged with an end of the mandrel; rotatably supporting the mandrel and the blank carried thereby between dies having opposed toothed work surfaces and relatively moving the dies on opposite sides of the mandrel to mesh opposed pairs of teeth on the work sufaces of the dies and mandrel with the sleeve portion of the member therebetween, deforming the sleeve portion radially in a rolling manner, rough forming splines as the mandrel rotates. The dies are then moved in opposite directions to mesh the mandrel teeth and the finishing teeth with the partially splined sleeve portion therebetween, finishing the forming operation. The method includes the step of chamfering the end of the sleeve portion opposite the end wall of the member, providing uniform radial deformation thereof during the splining operation.

The resultant power transmission member comprises a flat annular end wall extending radially about a central axis of the member. Splines are formed in an annular sleeve portion extending axially from the end wall. The member is characterized by an outwardly flared or chamfered flange at the end opposite the end wall thereof.

An advantage of the subject invention is that the chamfered flange increases the strength of the resultant member.

Another advantage of the subject invention is that forming of the chamfered flange results in uniform radial deformation of the sleeve about the toothed mandrel, maintaining the concentricity of the member during the splining operation, preventing splitting thereof and decreasing the scrap rate.

BRIEF DESCRIPTION OF THE DRAWINGS

FIG. 5 is a side-elevational view of the invention in the neutral position;

FIG. 6 is an enlarged perspective view of the invention incorporating linear die racks in the neutral position during the loading step;

FIG. 9 is a cross-sectional view taken substantially along the lines 9—9 of FIG. 12 showing rotary dies aligned in the neutral or loading position;

FIG. 10 is a sectional view of the invention incorporating rotary dies during the rough forming step of the operation;

FIG. 11 is a sectional view of the invention incorporating rotary dies during the finishing step of the splining operation;

DETAILED DESCRIPTION OF THE PREFERRED EMBODIMENTS

Figure 1:
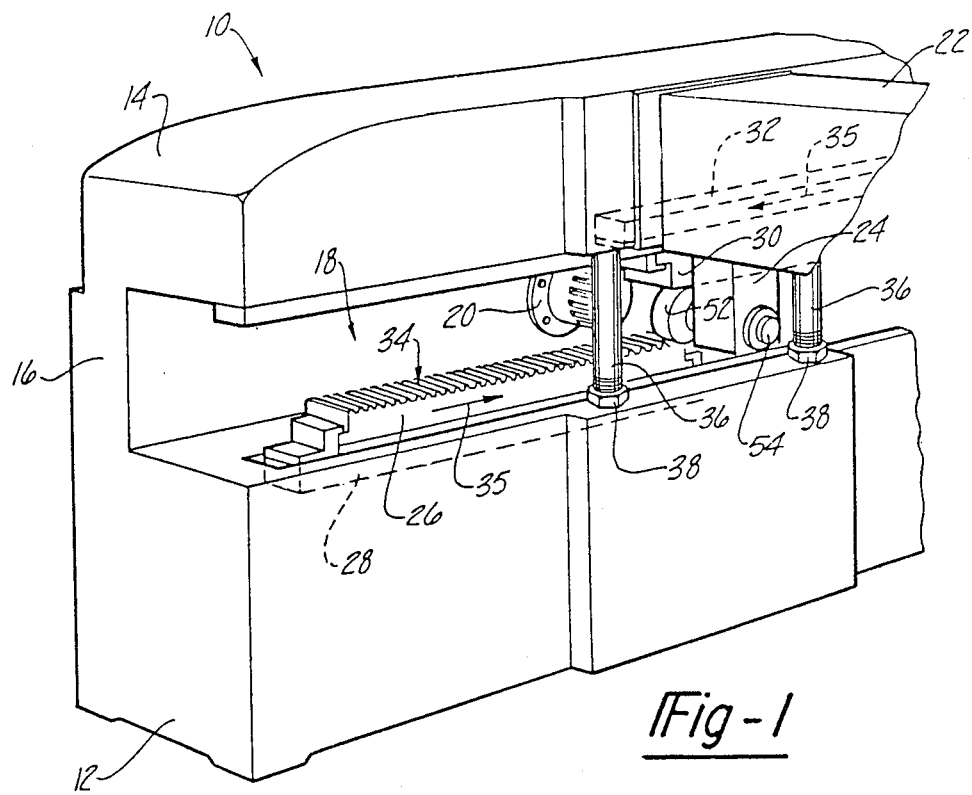
FIG. 1 is a perspective view of a spline-forming machine that embodies the present invention.

In FIG. 1 a spline forming machine, generally shown at 10, includes a lower support base 12, an upper base 14, and a support portion 16. The support portion 16 extends upwardly from the lower base 12 and the upper base 14 extends forwardly from the support portion 16 to cooperate with the lower base in defining a downwardly confined work space, generally indicated at 18. Within the work space 18, a fixed head stock 20 is mounted on the support portion 16 between the lower and upper bases 12 and 14. A tail stock support arm 22 projects from the upper base 14 and includes a suitable slide arrangement for supporting a tail stock 24. The tail stock 24 depends downwardly from the support arm 22 and is slidably movable toward and away from the head stock 20 along a rectilinear path.

Within the work space 18 of the machine, a lower die, shown in FIG. 1 as an elongated rack 26, is slidably supported on the lower base 12 by a slide support shown in phantom at 28. An elongated upper die 30 is supported on the upper base 14 by a slide support, also shown in phantom at 32. The slide supports 28 and 32 mount the dies 26 and 30 in a parallel spaced relationship with respect to each other for sliding movement between the end-to-end relationship shown in FIG. 1 and an overlapping relationship. Each of the dies 26 and 30 is elongated rectilinearly and has a work surface including teeth, generally indicated at 34, spaced along its length. The die teeth 34 extend transversely with respect to the direction of die movement and are oriented in a spaced and parallel fashion opposing the die teeth of the other of said die members when the dies assume their overlapping relationship after movement in the direction of the arrows 35 as shown in FIG. 1. The dies are actuated by a suitable power-operated actuator that coordinates the movement of each die with that of the other to perform a splining operation which will be hereinafter described. A pair of rods 36 extend between the lower and upper bases 12 and 14 and are threaded into respective nuts 38 on the bases to control the deflection permitted between the dies as the splining operation proceeds. Rotation of the rods 36 increases or decreases tension along the rod lengths depending on the direction of rotation to either allow greater or lesser die deflection as required. It will be appreciated by those skilled in the art that either rotary (FIGS. 9 through 13) or elongated dies (FIGS. 1 through 8) may be used in the subject invention, as will be set forth in the following description.

Figure 2:
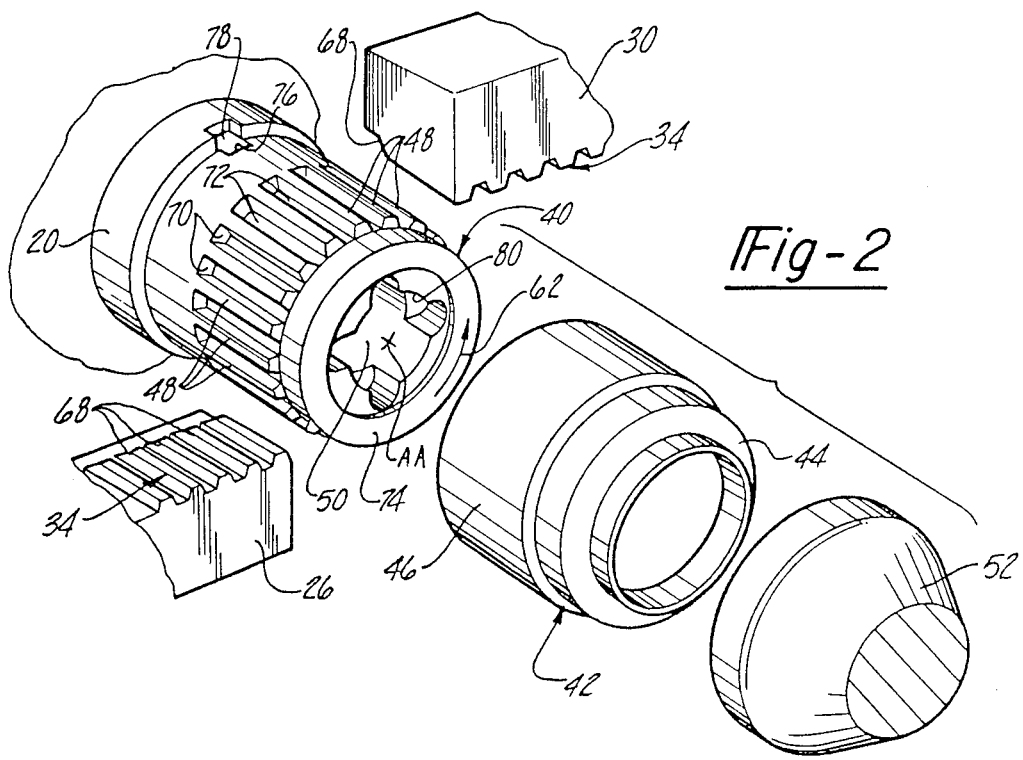
FIG. 2 is an exploded perspective view of the invention prior to commencement of the splining operation.
Figure 3:
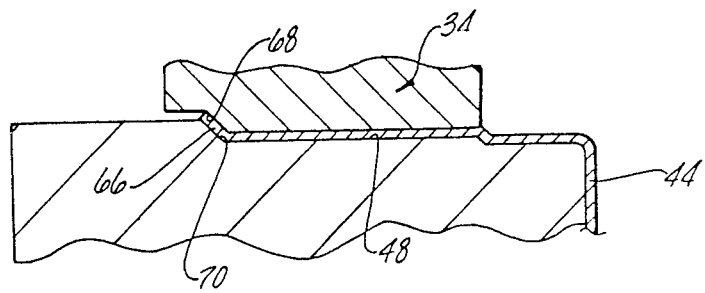
FIG. 3 is an enlarged fragmentary cross-sectional view of the mandrel, member being splined, and one of the dies.

With reference to FIG. 2, an externally toothed pinion-type mandrel, generally indicated at 40, is located between the lower and upper dies 26 and 30 to support a power transmission member on which splines are to be formed, such as the vehicle automatic transmission clutch hub blank, generally indicated at 42 in FIG. 2. It should be understood that other power transmission members used to transmit rotary power can likewise be splined by the machine and that it is not limited to clutch hubs even though the splining operation will be described in relation to this particular type of power transmission member.

FIG. 2 illustrates the configuration of a clutch hub blank 42 prior to being subjected to the splining operation of the machine 10. Each clutch hub blank 42 has a somewhat cup-shaped configuration with an open end and a partially closed end. The hub blanks each include an annular end wall 44 at the partially closed end and a side wall taking the form of a thin-walled annular sleeve portion 46. The end wall 44 and the sleeve portion 46 are both generated about the central axis of the hub blank. The end wall 44 extends radially with respect to this axis and is flat to permit mounting of the clutch hub after its splining operation on a clutch member of a vehicle automatic transmission. At the outer peripheral edge of the end wall 44, the annular sleeve portion 46 extends axially with respect to the central axis of the hub blank 42. The thin-walled construction of the annular sleeve portion 46 permits it to be deformed to form splines extending parallel to the central axis of the hub blank.

With particular reference to FIG. 2, the mandrel 40 has a central axis A—A about which a work surface having teeth 48 is generated. The mandrel teeth 48 project radially in an outward direction from the central mandrel axis A—A and are spaced about the axis so as to engage the annular sleeve poriton 46 of the clutch hub blank 42 mounted on the mandrel during the splining operation. The teeth 48 are elongated in a direction parallel to the central mandrel axis A—A. A central axial opening 50 extends between opposite ends of the mandrel.

An arbor 52 is mounted in a suitable manner on the tail stock 24 and includes a shaft 54 projecting toward the head stock 20. The tail stock 24 is movable toward and away from the mandrel 40, allowing the mandrel to accept a clutch hub blank 42 supported on an end thereof. The tail stock 24 is then moved toward the head stock 20 so that the ends of the mandrel opening 50 receive the shaft 54. The fixed head stock 20 and movable tail stock 24 then mount and support the mandrel in a rotatable fashion about axis A—A which is located midway between the upper and lower dies 26 and 30. For this purpose, an automatic feed rack may hold a member of blanks which may be successively fed onto the mandrel by the tail stock 24.

When the mandrel is thus supported, the lower and upper dies 26 and 30, shown as elongated racks in FIG. 2, are respectively positioned generally adjacent the upper and lower sides of the mandrel in an initial end-to-end relationship for loading of the blank onto the mandrel. The machine 10 is actuated to drive the dies 26 and 30 onto their overlapping relationship so that the die teeth 34 engage the outer surfaces on the annular sleeve portion 46 of the clutch hub blank 42. As the dies 26 and 30 move into their overlapping relationship, the portions of the respective die teeth 34 at opposite lateral sides of the dies and the adjacent portions of the mandrel teeth 48 are meshed with the sleeve poriton 46 of the hub blank located therebetween as in FIG. 3. The meshing of the die and the mandrel teeth deforms the sleeve portion 46 radially with respect to the central mandrel axis A—A and concomitantly therewith rotates the mandrel about this axis in the direction shown by the arcuate arrow 62 in FIG. 2 so the splining continues in a rolling manner to completion about the full circumference of the hub blank 42. The upper and lower dies simultaneously or synchronously deform the hub blank 42 to form splines (FIG. 2) at diametrically opposed positions on the mandrel 40.

Figure 4:
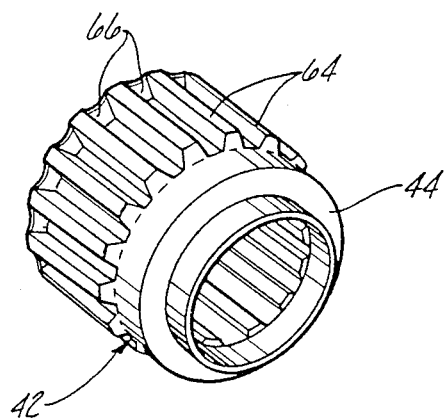
FIG. 4 is a perspective view of the resultant power transmission member.
Figure 7:
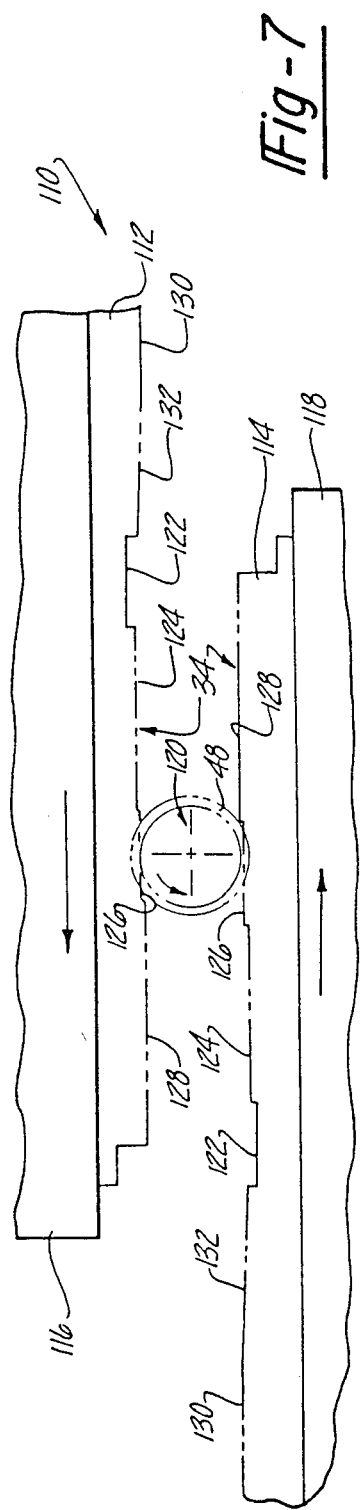
FIG. 7 is a side-elevational view of the invention during rough forming of splines in the clutch hub.
Figure 8:
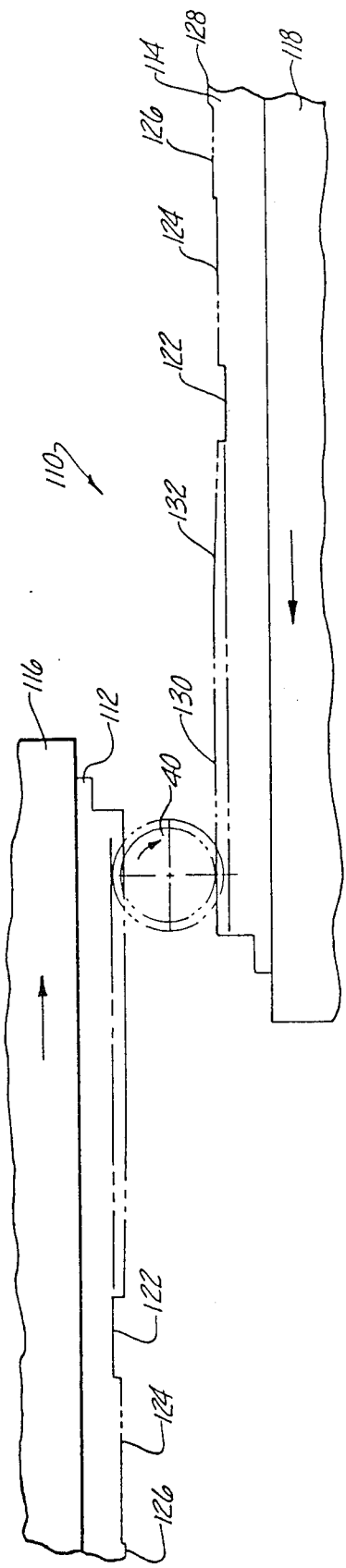
FIG. 8 is a side-elevational view of the invention during semi-finishing of splines in the clutch hub.

After the dies 26 and 30 have been moved into their overlapping relationships to complete the splining operation, the sleeve portion 46 of clutch hub 42 defines radially inwardly and outwardly facing splines 64 as seen in FIG. 4. The dies 26,30 are returned to their initial end-to-end relationship whereupon the splined member is removed and another blank loaded. The above-described opposed movement of the elongated racks from an initial end-to-end relationship (loading step) to an overlapping relationship is disclosed in U.S. Pat. No. 3,982,415, which also shows the die teeth having progressively increasing heights from one end of the die work surfaces to the other to gradually work the metal during the splining operation.

In accordance with the invention, an outwardly flared or chamfered flange, generally indicated at 66, is formed in the open end opposite the end wall 44 of the clutch hub 42 in a manner described below. The flange 66 adds strength and stability to the member and the forming thereof provides improved maintenance of the concentricity of the member during the splining operation, preventing splitting thereof and lessening the scrap rate.

Formation of the flange 66 on the member 42 is accomplished by meshing of the die teeth 34 each having a chamfered surface 68 at one end thereof, and mandrel teeth 48 each having a cooperable chamfered surface 70 at one end of a valley 72 separating each of the mandrel teeth 48, with said sleeve portion 46 therebetween. In operation, the sleeve portion 46 of the member 10 is positioned on the mandrel 40 with the end wall 44 of the member 10 flatly engaged with an end 74 of the mandrel; it is important that the annular end wall 44 be kept flat against the end 74 of the mandrel 40 at all times during the splining operation. The mandrel and the member carried thereby are thus rotatably supported between the pair of dies 26,30 while the end wall 44 of the member 10 is engaged in an opposed relationship to the end 74 of the mandrel 40, securing the member 10 in position on the mandrel; this is accomplished by moving the tail stock 24 having the shaft and arbor 52 secured thereon until the member 42 tightly engages the end 74 of the mandrel 40. The dies 26,30 are then moved in opposite directions on opposites of the mandrel 40 to mesh the die teeth 34 and the mandrel teeth 48 with the sleeve portion 46 of the member 10 therebetween so as to deform the sleeve portion 46 radially in a rolling manner forming splines 64 as the mandrel 10 rotates. During the rolling operation, the chamfered surfaces 68 of the die teeth 34 and the cooperating chamfered surfaces 70 on the mandrel 40 mesh together with the sleeve portion 46 therebetween to form the outwardly flared or chamfered flange 66 at the open end opposite the end wall 44 of said sleeve portion 46.

After the splining, the clutch hub is removed from the machine as an assembly by moving the tail stock 24 away from the head stock 20. An automatic ejector mechanism may be used to eject the splined members from the mandrel into a parts bin.

In application, the splines 64 permit clutch discs to be rotatably fixed to the clutch hubs either within or about the hubs and to be slidable along the central axis of the hubs.

With respect to mounting of the mandrel 40 upon the head stock 20, a slotted portion 76 is formed diametrically across one end of the mandrel 40 and receives a complementary projection 78 from the head stock 20. Similarly, there are provided notches 80 which engage complementary projections (not shown) on the end of the shaft 54 as the tail stock 24 is moved toward the head stock 20, rotatably supporting the mandrel at either end thereof.

In FIG. 4, the power transmission member is depicted as a splined clutch hub formed from the blank 42 by the rolling operation set forth above. The splines 64 of this clutch hub 42 are tough due to a minimum of work-hardening during the forming process. The sleeve portion 46 of the clutch hub includes lubrication ports (not shown) that may be formed prior to the splining operation and located between the outwardly projecting splines. During the splining operation, the axial length of the sleeve portion 46 remains generally constant and as mentioned above, the end wall 44 is maintained flat. There is a reduction in scrap rate attributable to splitting of the metal.

With reference to FIGS. 5 through 8, another spline-forming apparatus is generally shown at 110. A pair of die members, shown as elongated racks 112, 114, are respectively mounted on similar support members 116 and 118, which drive the dies in opposed directions (arrows) with a mandrel 120 therebetween. As shown in FIG. 6, a loading notch 122 is formed in the work surface of each die intermediate the ends thereof, allowing insertion and positioning of the sleeve portion 46 onto the mandrel 120 when the notches 122 are vertically aligned with one another in a neutral position (FIG. 6) on opposite sides of the mandrel. Groups of rough forming teeth 124, 126 and 128 extend respectively along one side of each of said notches 122 and progressively increase in height from group-to-group away from the notches so that opposed initial movement of the dies 112,114 (arrows) simultaneously engages opposed similar pairs of said rough forming teeth and said mandrel teeth 48 with said sleeve 46 therebetween partially forming splines therein. One or more groups of finishing teeth 130,132 extend respectively along the work surfaces of the dies 112,114 on the opposite side of the notches 122 from the rough forming teeth. The finishing teeth 130,132 have a generally greater height than the rough forming teeth 124,126,128, and comprise a group of transitional finishing teeth 132 situated between final finishing teeth 130 and the notch 122 on each work surface. The transitional teeth 132 progressively work the metal in preparation for the final finishing teeth 130 after the member has been splined by the largest group 128 of rough forming teeth. Following the rough splining operation, opposed movement of the dies 112,114 in the reverse direction simultaneously engages opposed pairs of similar finishing teeth 130,132 and the mandrel teeth 48 with the sleeve portion 46 therebetween to finish forming the splines 64 in the member 42. After the member has thus been completely splined, the dies are then returned to their initial relative positions, that is, the neutral or loading position, whereupon the splined member is removed or ejected and the process successively repeated with other blanks.

Figure 12:
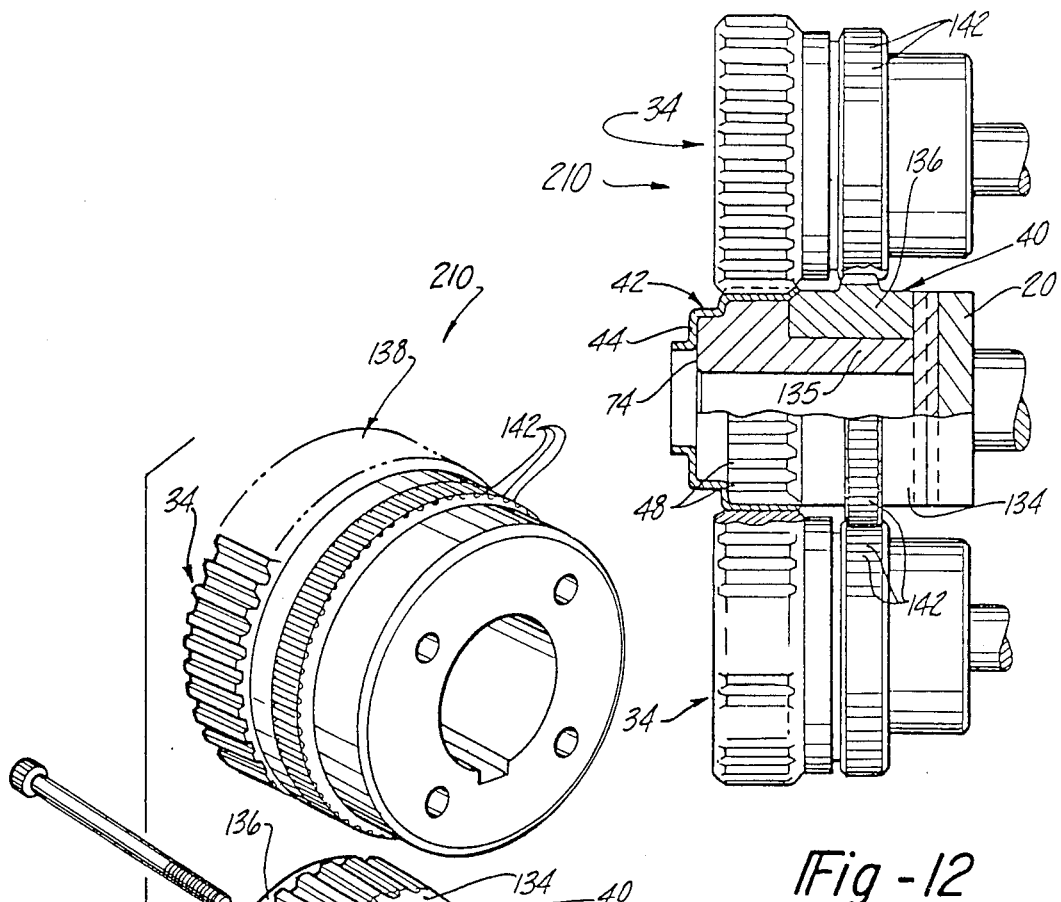
FIG. 12 is a side-elevational view of the invention incorporating rotary dies aligned in the neutral position.
Figure 13:
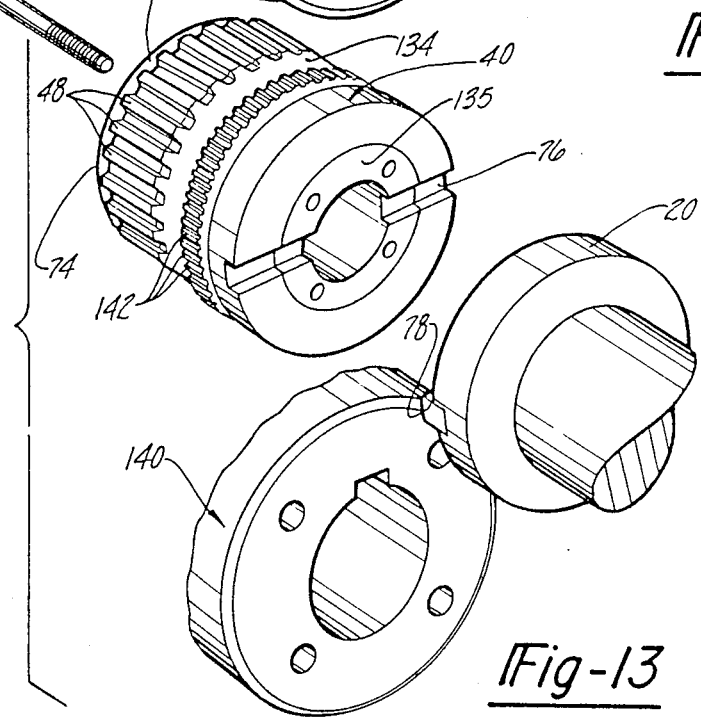
FIG. 13 is a rear perspective view of the invention incorporating rotary dies.

With reference to FIGS. 12 and 13, the mandrel 40 is shown comprising a separate flaring plate 134 having the chamfered surfaces 70 associated therewith. The flaring plate 134 is freely rotatable about a hub 135 of the main mandrel body 136, however, in normal operation the flaring plate 134 and body 136 are normally locked together by a keyed slot 76, formed in the diameters of the hub and flaring plate 143, respectively, for receiving a chuck member 78 from the head stock 20.

In FIGS. 9–13, there is shown a spline-forming apparatus having toothed die members 138,140 mounted for rotary movement. Each of the dies 138,140 is shown having a cylindrical configuration, including rough forming teeth 124,126,128 and finishing teeth 130,132 situated on opposite sides of a loading notch 122 with transitional finishing teeth 132 situated between the final finishing teeth 130 and the loading notch 122. The groups of rough forming teeth 124,126,128 progressively increase in height from group-to-group and are arranged on each die in a manner similar to that described in relation to the rotary-forming machine incorporating linear racks. While cylindrical dies have been shown, other die configurations presenting curvilinear tooth die surfaces could be employed, e.g. semicircular dies. Further, more than two dies could be utilized in the splining operation.

The method incorporating rotary dies is similar to that described above for die racks. The hub blank is loaded onto the mandrel 40 when the dies 138, 140 are in the loading position with the notches 122 vertically aligned with one another (FIG. 9). The dies 138,140 are then rotated relative to one another in an initial direction (arrows in FIG. 10) to mesh togeth the rough forming teeth 124,126,128 and the mandrel teeth 48 with the sleeve portion 46 therebetween to perform a rough splining operation. After a partial rotation in the initial direction, the dies are then relatively rotated in the reverse direction past the notch engaging first the transitional finishing teeth 132 then the final finishing teeth 130 together with the mandrel teeth 48 with the sleeve portion therebetween to finish forming the splines in the power transmission member (FIG. 11).

As mentioned above, rotary dies having chamfering means associated therewtih need not employ the back and forth splining feature incorporating notches on the dies. A pair of rotary dies 138,140 (FIGS. 12 and 13) and as shown in FIG. 6, a pair of die racks 112,114, having a mandrel 40, therebetween, include opposed rows of cooperating synchronizing teeth 142 respectively extending along said dies and mandrel parallel to said die teeth 34 and said mandrel teeth 48 and spaced inwardly therefrom. Opposed pairs of said synchronizing teeth 142 mesh together to drive and coordinate the rotation of said mandrel with the opposed movement of said dies for precise splining of a member therebetween. It is important that similar pairs of opposed die teeth simultaneously engage the mandrel teeth with the member therebetween to form diametrically opposed splines in the blank. The synchronizing teeth 142 on the mandrel and/or the dies are raised above the respective work surface, allowing engagement of opposed pairs of synchronizing teeth.

In the preferred operation of the subject invention, splines 64 are formed in a thin-walled annular sleeve portion 46 of a power transmission member 42 having an annular end wall 44 by rotatably supporting a mandrel 40 between a pair of spaced toothed dies 112,114,138,140 having rotary and/or rack configurations with notches 122 respectively formed intermediately along the toothed work surfaces of the dies. The end wall of the member 42 is then engaged in a flat opposed relationship to an end 74 of the mandrel during a loading step, securely positioning the member 42 on the mandrel when the notches 122 are vertically aligned in a neutral position on opposite sides thereof. The dies are then relatively moved meshing the mandrel teeth 48 and groups of rough forming die teeth 124,126,128 with the sleeve portion 46 therebetween, deforming the sleeve portion radially in a rolling manner, rough forming splines as the mandrel rotates. Subsequently, the dies are moved in a reverse direction, past the notches, meshing the mandrel teeth and opposed groups of finishing die teeth 130,132 with the partially splined sleeve portion 46 therebetween to finish forming the splines in the sleeve, thence the dies are returned to the neutral position and the resultant splined member is removed or ejected from the machine. Preferably, an outwardly flared or chamfered flange 66 is formed on the end of the sleeve portion opposite the annular end wall thereof by opposed chamfered surfaces 68,70 on the dies and mandrel, respectively, providing more uniform deformation of the member during the splining operation. Opposed rows of synchronizing teeth 142 on the dies and mandrel coordinate the meshing of opposing pairs of die teeth and mandrel teeth with the sleeve portion simultaneously forming diametrically opposed splines therein. The synchronizing teeth drive the rotation of the mandrel.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A thin-walled power transmission member (42) having a substantially uniform thickness throughout comprising: an annular end wall (44) extending radially about a central axis of said member; an annular sleeve portion (46) extending axially from said end wall, said sleeve portion (46) including axially extending splines (64) about its radius characterized by a chamfered flange (66) extending between each of said splines at an end opposite said end wall (44) thereof, the flanges and the splines terminating generally at the same radial distance from the central axis of the member.

2. A thin-walled power transmission member (42) having a substantially uniform thickness throughout comprising: an annular end wall (44) extending radially about a central axis of said member (42); an annular sleeve portion (46) extending axially from said end wall (44), said sleeve portion (46) including splines (64) having top portions and side walls and origin portions, characterized by said splines (64) including an end portion opposite relative to said end wall (44) and an outwardly flared flange integral with each of said origin portion and side walls, said flanges extending between each of said splines at each of said end portion, said flanges and the top portions of said splines terminating generally at the same radial distance from the central axis of said member (42).

* * * * *